April 27, 1937.   J. F. KOVALSKY   2,078,673
ALTERNATING CURRENT MOTOR CONTROL SYSTEM
Filed March 29, 1933
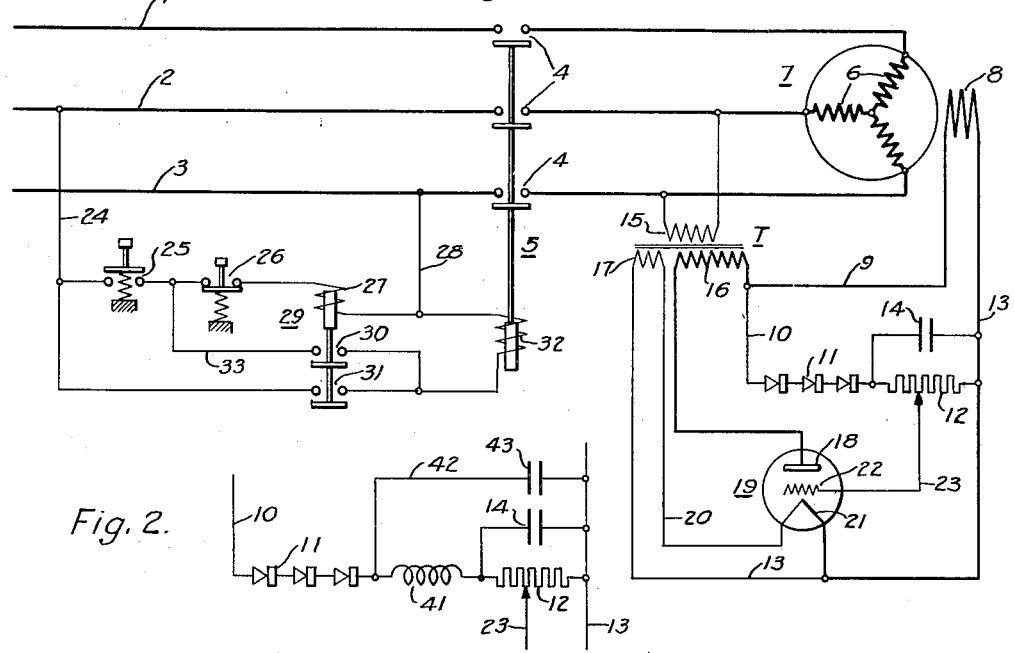
Fig. 1.
Fig. 2.
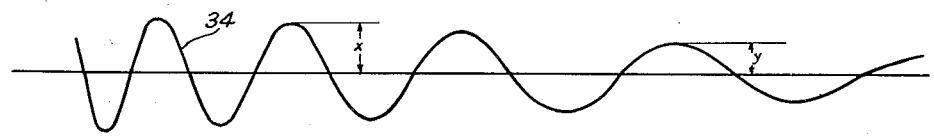
Fig. 3.
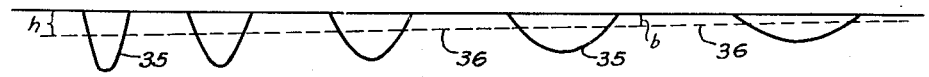
Fig. 4.
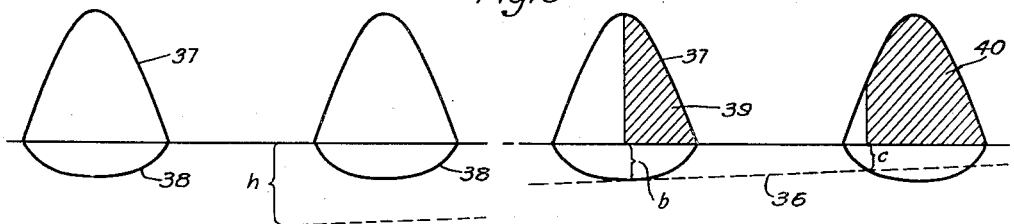
Fig. 5
WITNESSES:
Fred C. Pilham
Paul E. Friedemann
INVENTOR
Joseph F. Kovalsky
BY
W. R. Coley
ATTORNEY Patented Apr. 27, 1937

2,078,673

UNITED STATES PATENT OFFICE 2,078,673

ALTERNATING CURRENT MOTOR CONTROL SYSTEM

Joseph F. Kovalsky, Turtle Creek, Pa., assignor to Westinghouse Electric & Manufacturing Company, East Pittsburgh, Pa., a corporation of Pennsylvania Application March 29, 1933, Serial No. 663,364

24 Claims. (Cl. 172—289)

My invention relates to systems of control for alternating current motors.

It is an object of my invention to vary the energization of an electric motor from the start to running conditions by thermionic control means.

Another object of my invention is to energize the field winding of a synchronous motor with unidirectional current from the same source of alternating current connected to the armature of the motor.

A further object of my invention is the provision of thermionic means responsive to the characteristics of the current in the field circuit and the characteristics of the current of a source of supply for controlling the time and amount of energization of the field circuit.

A still further object of my invention is to effect the energization of the secondary winding of a motor when the current characteristics in the secondary relative to the current characteristics in the primary are a certain value.

Other broader and also more detailed advantages and objects will become apparent from a study of the following specification when considered in conjunction with the accompanying drawing, in which:

Figure 1 is a diagrammatic showing of a system of control embodying my invention;

Fig. 2 is a partial view of the discharge circuit for the field winding of the synchronous motor associated with the electric discharge or thermionic device shown in Fig. 1;

Fig. 3 illustrates the variation of the alternating current in the field winding during the acceleration of the synchronous motor;

Fig. 4 illustrates both the average, as well as the instantaneous oscillations of the current in the field winding for the circuit arrangements shown in Figs. 1 and 2; and Fig. 5 illustrates a plurality of curves showing the voltages impressed upon the thermionic device shown in Fig. 1 and the negative bias required in each case to effect the breakdown or discharge of the thermionic device.

Referring more particularly to Fig. 1, 1, 2 and 3 designate the three buses of a source of alternating current such as is usually found in industrial applications, namely, a source having a substantially constant frequency and a substantially constant voltage. A synchronous motor 7 is shown associated with this source of alternating current and may be connected thereto by the line contactor 5. It is, of course, understood that the system of control herein shown is not necessarily limited to the starting of a synchronous motor and that the description herein given is merely illustrative of my invention.

The synchronous motor 7 has the conventional armature winding 6 and a field winding 8 which is provided with the discharge circuit including the conductors 9, 10, rectifying means 11, which rectifying means are usually copper oxide rectifiers, a current limiting means 12 and a capacitor 14 and conductor 13. A transformer T is energized from the buses 2 and 3 when the line contactor 5 is closed and may thus energize the thermionic device 19 and the field winding 8 in a manner disclosed more in detail hereinafter. The starting of the synchronous motor is, of course, effected by the line contactor 5 which is, in turn, controlled by the set-up or control relay 29.

A better understanding of the advantages of my invention may probably be had by a study of the sequence of starting of the motor. Assuming that the motor 7 is to be accelerated, the attendant actuates the starting push button 25, thereby establishing a circuit from the bus 2 through conductor 24, starting push button 25, stop push button 26, actuating coil 27 of the control relay 29 and conductor 28 to the bus 3. The control relay 29 thus operates immediately and establishes a holding circuit for itself from the conductor 24 through contact members 31 and 30, conductor 33, stop push button 26, the actuating coil 27 to the energizing conductor 28. An energizing circuit for the line contactor is also established from the energized conductor 24 through contact members 31, actuating coil 32 of the line contactor 5 to the energized conductor 28.

With the operation of the line contactor 5, the contact members 4 are closed, thereby energizing the armature winding 6 of the motor 7 and also energizing the primary winding 15 of the transformer T.

The transformer T is provided with a pair of secondary windings 16 and 17. The secondary winding 17 through conductors 13 and 20 energizes the filament 21, constituting one of the principal electrodes of the thermionic device 19. The secondary winding 16 has one of its terminals connected to the plate 18, constituting the other principal electrode, of the thermionic device 19, and has its other or, as shown, right-hand terminal connected to the junction of conductors 9 and 10. The grid 22 of the thermionic device is connected adjustably by a conductor 23 to the current limiting device 12 constituting part of the discharge circuit for the field winding 8. From this arrangement of circuits, it is obvious that the secondary winding 16 has one closed circuit through the conductor 10, rectifying means 11, a portion of the current limiting means 12, conductor 23, grid 22 and plate or anode 18, whereas a second circuit for the secondary winding is through conductor 9, field winding 8, conductor 13, the principal electrodes 21 and 18 back to the secondary. With the circuit arrangement shown, substantially no current flows in the second-named circuit as long as the absolute value of the negative bias on the grid 22 relative to the negative voltage of the cathode 21 is large. However, when the absolute value of the negative bias decreases to a predetermined value, the thermionic device 19 breaks down, that is a discharge occurs between the principal electrodes, thereby establishing an energizing circuit for the field winding through the second circuit traced for the secondary winding 16.

The rectifiers are so selected that current for the negative portion of the cycle in the secondary winding 16 tends to traverse the first-mentioned circuit. The grid 22 and the cathode 21 are thus negative for the negative portion of the cycle.

The value of the negative bias at the instant of starting is, of course, determined by the position of the adjustable conductor 23 on the resistor 12. The rate with which the absolute value of negative grid bias decreases during the acceleration of the motor depends upon the slip, the characteristics of the field winding, and the effects of the filter circuit.

During normal, or full speed, operation the absolute value of negative grid bias is small so that the tube 19 breaks down at each negative portion of the cycle. The field winding is thus provided with unidirectional current, as will be more apparent from the portion of the disclosure given hereinafter.

Since the transformer T is energized, as heretofore explained, by the closure of the contact members 4 and the armature winding 6 is also energized, the motor 7 will start to rotate, operating as an induction motor. At the instant of starting, a current having a frequency equal to the frequency of the source of supply is induced in the field winding and as the motor accelerates, the frequency of this current, as well as the amplitude thereof, decreases, as indicated in Fig. 3. At some large slip, the amplitude may be, as shown at X, whereas at some considerably less slip the amplitude may be as indicated at Y.

This alternating current induced in the field winding 8 traverses the discharge circuit hereinbefore traced. However, since rectifying means 11 are interposed in the discharge circuit, the current traversing the discharge circuit is in reality not as indicated by curve 34 in Fig. 3 but is, in the absence of any filtering means, more accurately designated by the curve 35 shown in Fig. 4. In most instances the combined action of the inductive effect of the field winding, the characteristics of the rectifying means, the current limiting means 12, and the capacitor 14, cause the curve 35 to be smoothed out so that it follows substantially the path indicated by the dashed curve 36 shown in Fig. 4. It will be noted that the curve 36 varies its negative amplitude from $h$ through $b$ to zero at a low frequency of the current in the field winding 8.

In some instances, it has been found that the field winding 8 does not have the necessary filtering effect upon the rectified currents 35 flowing in the field winding. For such cases, the circuit arrangement shown in Fig. 2 is preferable, where the discharge circuit does not only include the resistor or current limiting means 12 and the capacitor 14 but also includes a reactor 41 and a shunt circuit for the reactor 41 and capacitor 14 and resistor 12 connected in parallel, through conductor 42 and capacitor 43. It is thus obvious that regardless of the inductive characteristics of the field winding, the necessary filtering effect can in all cases be secured by a proper selection for the characteristics of the discharge circuit.

Since the secondaries 16 and 17 are energized, the voltages impressed upon the principal electrodes 18 and 21 of the thermionic device 19 will be represented by the curves 37 shown in Fig. 5. However, as long as the percent slip of the motor is high, the negative bias on the grid 22, namely the curve 36, would have a considerable amplitude such as indicated at $h$ in Figs. 4 and 5 and in consequence the thermionic device will not break down or discharge to cause a free flow of current between the principal electrodes. However, as the speed of the motor increases and in consequence the amplitude of the curve 36 decreases, a point will be reached where the bias on the grid 22 is such, as indicated by the amplitude $b$ in Fig. 5, that the thermionic device breaks down and current then flows in one direction through the field winding 8, that is from the left-hand terminal of the secondary winding 16, the principal electrode 18, the principal electrode 21, conductor 13, the field winding 8 and conductor 9 to the right-hand terminal of the secondary 16. The motor will thus further increase in speed and the amplitude of the curve 36 will further decrease, as is indicated for the amplitude $c$ in Fig. 5. The field winding will thus, once the thermionic device 19 has started to break down, continue to be energized with unidirectional current from the source of alternating current.

Since the conductor 23 may be made to engage the current limiting means 12 at any point, the amplitude $b$ at which the first break-down occurs may be selected at will and in consequence a substantially exact percentage of synchronous speed may be selected at which the field winding 8 becomes energized with direct current and thus causes the synchronous motor 7 to pull into step. My invention, therefore, provides a very simple inexpensive and accurate means for controlling the acceleration of the synchronous motor by predetermining the speed at which the field winding shall become energized. The speed, of course, may range anywhere from 75% synchronous speed or possibly lower to synchronous speed, the selection being made at will by the shifting of the conductor 23.

Fig. 5 illustrates the curves 37 and 38 corresponding to the characteristics of the thermionic device, whereas the curve 36 represents the variations in bias on the grid 22. As this bias varies and decreases in absolute value along more or less uniform slope to the value $b$, the thermionic device is caused to operate. Fig. 5, however, does not show a continuous set of curves but merely shows two portions of a plurality of operating conditions. The curves shown in Figs. 3, 4 and 5 are not drawn to some common scale but do show, in a general way, the operating characteristics in the various circuits. Fig. 5, in fact, embodies two different scales which are considerably larger than the scale used in Figs. 3 and 4 which thus accounts for the difference in position of the curve 36.

From the foregoing disclosure, it is readily apparent that my system of control, namely, the thermionic device 19 and the associated elements, automatically provides for interrupting the direct-current excitation of the field winding 8 if the motor 7 should be pulled out of synchronism, as for instance, by reason of an overloading of the motor. As soon as the overload is taken off and the slip voltage again decreases, synchronization is again automatically effected as in the first instance, namely, for regular starting of the system of the motor. In other words, if the synchronous motor 7 falls out of synchronism for any reason whatsoever, as an overload, a voltage dip on the busses 1, 2 and 3, or some other cause, a slip voltage is induced in the field winding 8 which will result in a negative bias of sufficient magnitude on the grid 22, exactly as described for synchronization during conventional starting. The tube 19 will thus cease to supply direct current to the field winding 8 as long as the negative bias is sufficiently low to prevent a discharge in the tube 19. As the rotor again speeds up approaching synchronous speed, the induced slip voltage falls, causing a less negative potential on the control grids 12 and 13 until the critical potential for tube 19 is again passed, whereupon tube 19 begins passing field excitation current once more.

While the modification of my invention herein described is specifically related to a synchronous motor and more particularly to the energization of the field of the synchronous motor, it is readily apparent that my invention may be well adapted to other control requirements. I do not wish to be limited to the specific arrangement shown but limitations that are to be made in my invention are only such as are necessitated by the prior art and the scope of the appended claims.

I claim as my invention:

1. In a system of control for motors of the alternating current type, in combination, a source of alternating current, a motor having a primary winding and a secondary winding, means for connecting the primary winding to the source of alternating current, a discharge circuit for the secondary winding, thermionic means, circuit means for interconnecting both the thermionic means and the secondary winding with the source of alternating current for energizing the thermionic means and secondary, means interconnected with the discharge circuit and the thermionic means for controlling the thermionic means to control the operating characteristics of the motor.

2. In a system of control for motors of the alternating current type, in combination, a source of alternating current, a motor having a primary winding and a secondary winding, connecting circuits adapted to connect both of said windings to said source of alternating current, and thermionic means for controlling both, the time of energization of the secondary winding relative to the time of energization of the primary winding and the amount of energization of the secondary winding.

3. In a system of control for motors of the alternating current type, in combination, a motor having an armature winding and a field winding, a source of alternating current, means for connecting the source of alternating current to the armature winding, and thermionic means responsive to certain electrical characteristics of the current supplied to the armature winding from said source of alternating current and certain electrical characteristics of the current in said field winding for controlling the operating characteristics of the motor.

4. In a system of control for motors of the alternating current type, having a pair of windings, in combination, a motor, a source of alternating current, means for connecting said source to one of said windings, and thermionic means interconnected with both of said windings and responsive both to certain electrical characteristics of the current supplied from said source to the said one winding and certain electrical characteristics of the current in the other of said windings for controlling the operating characteristic of said motor, and energizing the other of said windings with direct current from said source of alternating current.

5. In a control system for starting a synchronous motor, in combination, a source of alternating current, a synchronous motor having an armature winding and a field winding, means for connecting the armature winding to said source, a discharge circuit for the field winding, thermionic means having an anode, a cathode, and a control grid, transformer means disposed to be controlled by said means for connecting the armature winding to said source, and adapted to energize the said cathode and the field winding, and means for interconnecting the discharge circuit with the grid to control the operation of said thermionic means.

6. In combination with the field winding of a synchronous motor having a field winding, a field discharge circuit including rectifying means and current limiting means, a source of alternating current, thermionic means interconnected with the source of alternating current, the field discharge circuit, and the field winding adapted to control the energization of said field winding from said source of current.

7. In combination with the field winding of a synchronous motor, a field discharge circuit including current limiting means, a source of alternating current, and thermionic means interconnected with said current limiting means and responsive to certain electrical characteristics in said current limiting means for automatically controlling the unidirectional energization of said field winding from said source of alternating current.

8. In combination with the field winding of a synchronous motor, a discharge circuit including a variable impedance and rectifying means whereby alternating currents in said field winding are both filtered and rectified, a source of alternating current, thermionic means including a cathode, an anode, and a grid, means for interconnecting the source of alternating current with the field winding, and with the rectifying means, the variable impedance, the grid, and the anode, and means for interconnecting the source of alternating current with the field winding whereby the field winding may be energized with unidirectional current from the source of alternating current when the alternating current in the field winding has a certain characteristic with regard to a characteristic of the current from the source of alternating current.

9. In combination with a synchronous motor having a primary winding and a field winding, of circuits including said field winding, and thermionic means conductively related to said circuits and controlled by the current in said field winding when said current has a certain characteristic to thus control the time of energization of said field winding by unidirectional current.

10. In a system of control for starting a motor having a field winding, and starting and running connections for the motor, thermionic means controlled in accordance with the current traversing said winding during the starting connection for determining the time and amount of energization of said winding for the running connection.

11. In a system of control for a motor of the alternating current type, in combination, a source of alternating current, a motor having primary and secondary windings, means for connecting the source of current to the primary winding, and thermionic means, interconnected with said secondary winding and energized by the operation of the means for connecting the source of current to the primary winding and the current in the secondary winding, adapted to automatically energize the field winding with unidirectional current when the speed of the motor is a given value relative to the frequency of the source of alternating current.

12. In a control system for starting a synchronous motor, in combination, a motor having a field winding, a current limiting means in the field circuit, thermionic means having a principal and a control electrode, said electrodes being interconnected with at least a portion of the current limiting means, a cathode for the thermionic means, means for energizing the cathode by an alternating current of substantially constant voltage and frequency, and circuit means including a source of alternating current, the field winding and the principal electrodes of the thermionic means.

13. In a synchronous motor system having a primary and secondary winding and thermionic rectifying means, the method of controlling the field excitation which comprises rectifying the slip voltage induced in a winding of said motor, applying said rectified voltage to the control element of said thermionic rectifier, and applying excitation current to the motor field when said control element is at one potential and interrupting said excitation current when said control element is at a different potential.

14. In an alternating current motor control system, the combination of a motor having armature and field windings, means for applying power to the armature winding and for exciting the field winding, and control means responsive to slip voltage and independently of slip frequency in said field winding for interrupting the excitation of said field winding when said motor falls out of synchronism.

15. In an alternating current motor control system, the combination of a motor having an armature and a field winding, means for applying power to said windings, and control means responsive to slip voltage and independently of slip frequency developed in said field winding which control means maintains connection between said power supply and said field winding only while said motor is operating at substantially synchronous speed.

16. In an alternating current motor control system, the combination of a motor having an armature and a field winding, means for supplying power to said windings, and control means including a rectifier, which control means is responsive to slip voltage and independent of slip frequency developed in said field winding and maintains connection between said power supply and said field winding only while said motor is operating at substantially synchronous speed.

17. In an alternating current motor control system, the combination of a motor having an armature and a field winding, means for supplying power to said armature winding, rectifying means for supplying field excitation current to said motor, and means responsive to slip voltage and independent of slip frequency developed in said field winding for controlling said rectifying means.

18. In a synchronous motor control system, the combination of a motor having an armature and a field winding, an alternating current power source, means for connecting said source to said armature winding, means for supplying rectified current to said motor field winding, said means including a space discharge device having a control electrode, other means for rectifying the slip voltage developed in said field winding during sub-synchronous operation and impressing the rectified slip voltage upon said control electrode.

19. In an alternating current motor control system, the combination of a motor having an armature and a field winding, means for supplying power to said armature windings, means for rectifying any slip voltage developed in said field winding, and thermionic means responsive to the value of said rectified slip voltage for establishing and discontinuing excitation current for said field winding independently of the slip frequency.

20. In a synchronous motor control system, the combination of a motor with an armature and a field winding, an alternating current power source, means for connecting said source to said armature winding, means for supplying rectified current to said motor field winding, said means including a space discharge device having a control electrode, means for impressing a controlling potential upon said electrode which varies in degree with variations in the slip voltage developed in said field winding.

21. In a synchronous motor control system, the combination of a motor having an armature and a field winding, an alternating current power source, means for connecting said source to said armature winding, means for supplying rectified current to said motor field winding, said means including a space discharge device having a control electrode, and rectifying means for supplying a controlling potential derived from slip voltage to said electrode.

22. In a system for supervising field excitation in alternating current motors having an armature and a field winding, means for applying power to the armature winding and for exciting the field winding, control means including a thermionic tube for interrupting said excitation in response to a slip voltage developed in said motor field winding and for reestablishing said excitation in response to a lower slip voltage developed in said field winding.

23. In a system for supervising field excitation in alternating current motors having an armature and a field winding, means for applying power to the armature winding and for exciting the field winding, control means including a thermionic tube for interrupting said excitation in response to a slip voltage developed in said motor field winding and for reestablishing said excitation when a predetermined lower slip voltage is developed in said field winding.

24. In a system for supervising field excitation in alternating current motors having an armature and a field winding, means for applying power to the armature winding and for exciting the field winding, automatic control means including a thermionic tube for interrupting said excitation in response to a slip voltage developed in said motor field winding and for reestablishing said excitation in response to a lower slip voltage developed in said field winding.

JOSEPH F. KOVALSKY.